United States Patent [19]

Kish

[11] Patent Number: 5,305,992

[45] Date of Patent: Apr. 26, 1994

[54] MEASURING FIXTURE WITH GAUGE BALL

[75] Inventor: William S. Kish, Riverview, Mich.

[73] Assignee: The Budd Company, Troy, Mich.

[21] Appl. No.: 49,774

[22] Filed: Apr. 19, 1993

[51] Int. Cl.⁵ .............................................. B25B 1/22
[52] U.S. Cl. ...................................... 269/51; 269/71;
269/75; 269/78; 269/228; 269/266; 269/274;
269/296
[58] Field of Search ....................... 269/71, 75, 77, 78,
269/296, 228, 266, 274, 47, 50, 51; 248/631,
157, 571, 583, 663, 180, 181, 182, 187, 354.1

[56] References Cited

U.S. PATENT DOCUMENTS

| | | |
|---|---|---|
| 2,731,863 | 1/1956 | Bellows ................... 269/75 |
| 2,779,092 | 1/1957 | Gordon . |
| 2,796,787 | 6/1957 | Aske ..................... 269/274 |
| 3,559,980 | 2/1971 | Tersi et al. ............ 269/296 |
| 3,872,760 | 3/1975 | Desnoyers ............. 269/228 |
| 4,121,817 | 10/1978 | Pavlovsky . |
| 4,183,511 | 1/1980 | Marek . |
| 4,387,886 | 6/1983 | Schlegel et al. ....... 269/78 |
| 4,400,969 | 8/1983 | Specktor . |
| 4,491,306 | 1/1985 | Eickhorst .............. 269/75 |
| 4,579,271 | 4/1986 | Fujita et al. . |
| 4,641,819 | 2/1987 | Poland . |
| 4,682,766 | 7/1987 | Barkley . |
| 4,683,633 | 8/1987 | Loris . |
| 4,684,113 | 8/1987 | Douglas et al. . |
| 4,787,613 | 11/1988 | Hayes ................... 269/75 |
| 5,026,033 | 6/1991 | Roxy . |

FOREIGN PATENT DOCUMENTS 764351 12/1956 United Kingdom .

Primary Examiner—Robert C. Watson
Attorney, Agent, or Firm—Harness, Dickey & Pierce

[57] ABSTRACT

Disclosed is a workpiece retention assembly including a plurality of measuring fixtures for supporting and positioning a workpiece. The measuring fixtures are aligned along a platform for positioning the measuring fixtures. The measuring fixtures include a selectively adjustable stanchion and a selectively rotatable clamping member for retaining the workpiece. Workpieces of widely varying types, shapes and sizes can thus be positioned using the measuring fixtures according to the teachings of the present invention.

7 Claims, 4 Drawing Sheets 5,305,992

MEASURING FIXTURE WITH GAUGE BALL

BACKGROUND OF THE INVENTION

1. Technical Field

This invention relates generally to a workpiece retention assembly and, more particularly, to a method and apparatus for supporting and positioning a workpiece.

2. Discussion

To use an inspection system to measure a workpiece it is highly beneficial and, for the most part, a requirement that the workpiece being inspected is accurately positioned and securely maintained in that position.

The conventional workpiece holder for use with an inspection system generally uses a single type of device positioned along a variety of locations on the workpiece. Moreover, the positioning devices are usually specially made for a specific workpiece and can not be used for other workpieces. In other words, conventional workpiece positioning and holding devices lack universality in that a single set up positioning device can not be used for workpieces having varied shapes and sizes. U.S. Pat. No. 4,641,819 to Poland discloses a jig assembly for holding a variety of workpieces for assembly or machining processes. Individual workpiece positioners are permanently attached to a base portion and a matrix configuration. Each positioner can be raised or lowered, and can reach points within a certain range by rotating a tip around 3 differing axis A, B and C. It appears that the workpiece rests on a supporting ledge adjacent the tip. One draw back of this workpiece holder is that it is not truly universally adjustable. As one axis is adjusted the other two are necessarily effected.

U.S. Pat. No. 3,681,834 to Seidensaden discloses a fixing and tensioning system for workpieces to be mechanically processed. A template is used over a platform having a uniform rectangular grid. The template indicates positions for modular units to support different workpieces. The modular units do not appear to be adjustable such that the fixing and tensioning system is truly universal.

British Patent No. 764,351 discloses a jig assembly for supporting motor vehicle body shells of differing sizes. A series of location units are arranged on the platform having a number of places for securing the units. The units can be moved to other locations on the platform to support other size vehicle frames. It does not appear however that the location units themselves are adjustable.

This invention eliminates the above described problems as well as many others. Up until now a universal workpiece measuring fixture for positioning and supporting a workpiece in a specific location was not known. This invention enables the operator to easily change from one workpiece to another using the same set of measuring fixtures. This invention also allows the operator to set the measuring fixture to support the workpiece at various desired angles.

SUMMARY OF THE INVENTION

A workpiece retention assembly in accordance with the teachings of the present invention includes a selectively adjustable workpiece measuring fixture for retaining a workpiece in a predetermined arrangement on a substrate. Generally, the substrate is a platform which includes a matrix of holes for receiving fasteners which secure the measuring fixture to the platform. By securing the workpiece measuring fixture to the platform and providing the measuring fixture with an adjustable stanchion and selectively rotatable portion including a clamping mechanism which retains the workpiece in place a number of various shaped workpieces can be positioned using the same set of measuring fixtures.

According to the preferred embodiment the workpiece measuring fixtures include a base portion, an adjustable shaft including a head portion for supporting a portion of the workpiece and a rotatable plate which includes a clamping mechanism to retain the workpiece on the measuring fixture. The head portion can be provided with a selectively attachable support member which includes a flat surface for hosting a substantially planar portion of a workpiece and optionally can be provided with an extending post member which is insertable through holes contained on the workpiece. The measuring fixture can come in different sizes and is adjustable thereby allowing the operator to manipulate the fixture and set it at the desired position. The versatility of the measuring fixture provides a support and positioning system which is universal.

BRIEF DESCRIPTION OF THE DRAWINGS

These and other advantages of the present invention will become apparent to those skilled in the art after studying the following text and by reference to the drawings in which.

DETAILED DESCRIPTION OF THE PREFERRED EMBODIMENT

Figure 1:
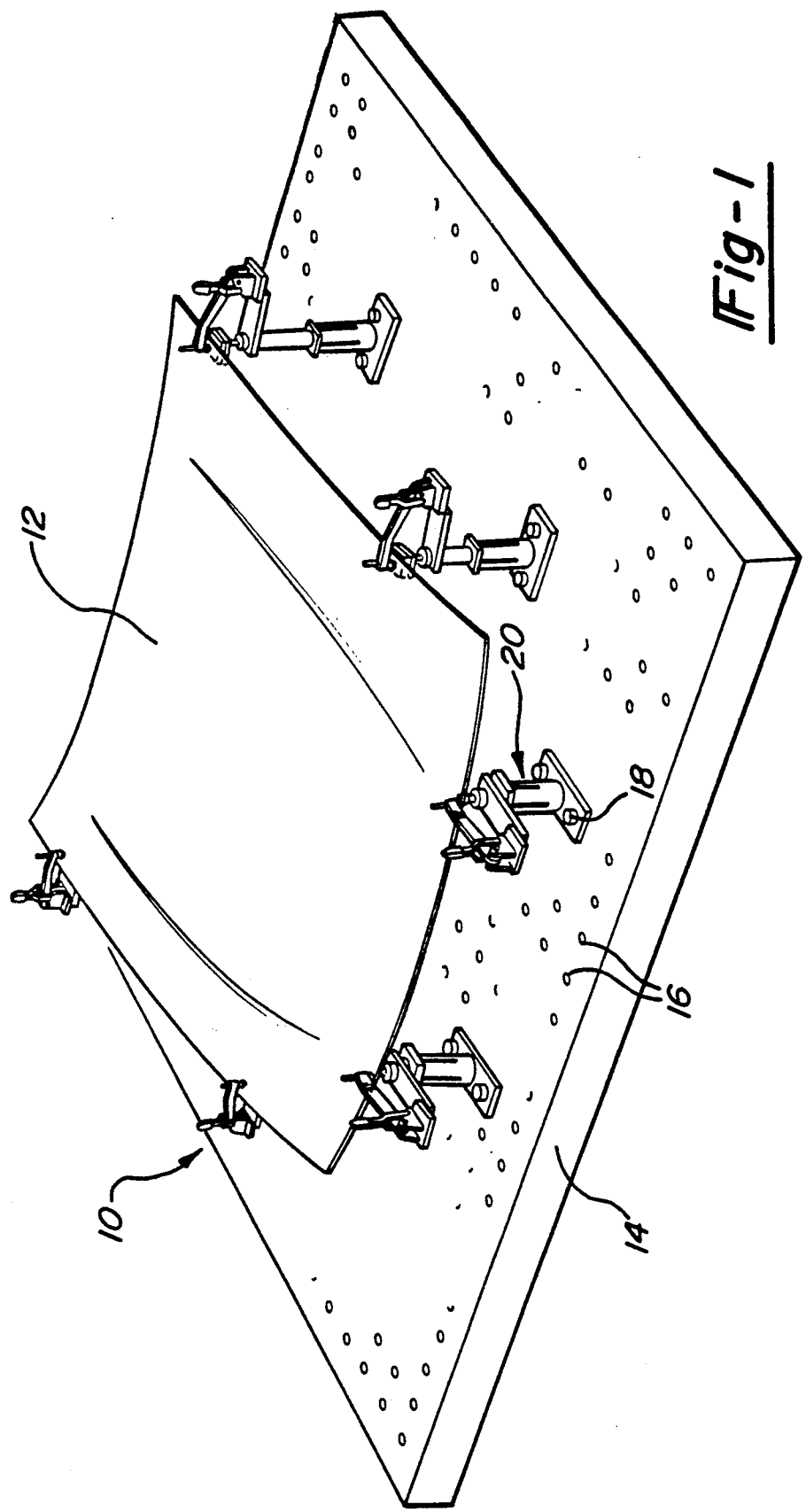
FIG. 1 is a perspective view which illustrates a plurality of measuring fixtures positioning and securing a workpiece.

FIG. 1 illustrates a workpiece retention assembly 10 including a preferred embodiment of the measuring fixture 20 according to the teachings of the present invention. According to this embodiment a workpiece 12, in this case a hood for an automobile, is shown being supported and positioned in a workable position by plurality of measuring fixtures. A plurality of measuring fixtures are positioned upon a platform 14 at the desired locations and secured to the platform through the use of fasteners 18. Various fasteners 18 can be utilized to secure the measuring fixtures to the platform 14. Typically however, the fasteners 18 utilized are in the form of threaded bolts which mate with threaded holes 16 contained on the platform 14. The holes 16 are arranged in a predetermined matrix having an adequate distance from each other such that the measuring fixtures can be positioned to retain almost any size or shaped workpiece 12. Generally, the holes 16 are arranged in a rectangular array. As can be seen in FIG. 1, the workpiece is positioned in a body position, i.e. the position it would be maintained in during normal use.

As indicated by FIG. 1 the measuring fixture 20 provides various functions. The measuring fixture 20 provides reference points (described below) for an inspection probe used with computerized inspection equipment such as a coordinate measuring machine (not shown). The measuring fixture 20 also provides a clamping function by holding down the top surface of the workpiece. Still further, the workpiece measuring fixture serves to secure the workpiece in the desired workable position.

Figure 2:
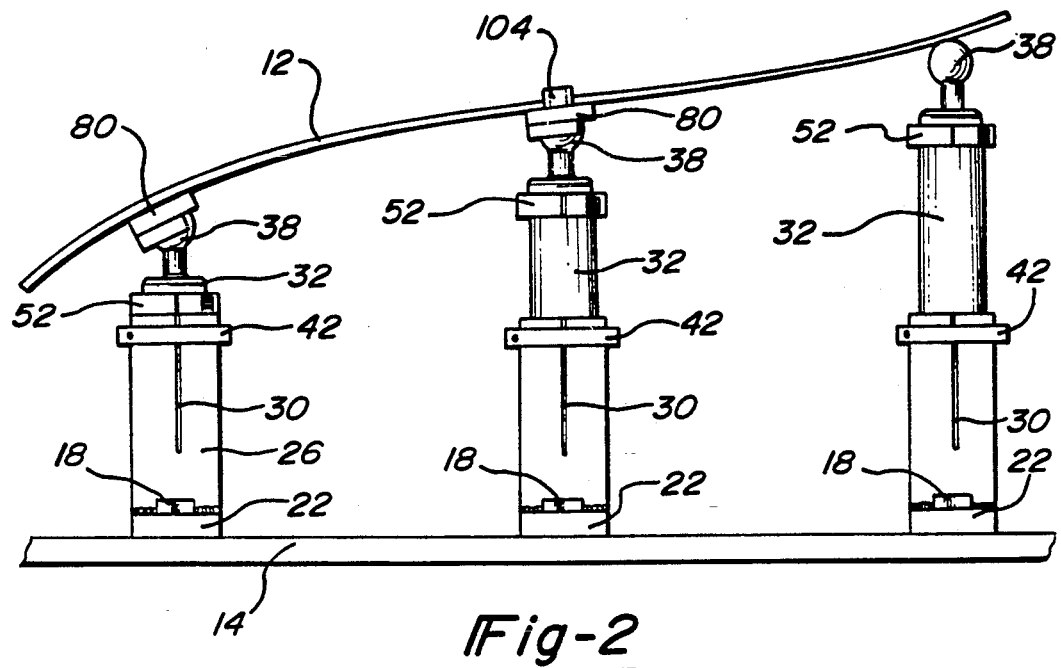
FIG. 2 is a side elevation view illustrating a plurality of measuring fixtures positioned along a retaining platform securing a workpiece.
Figure 3:
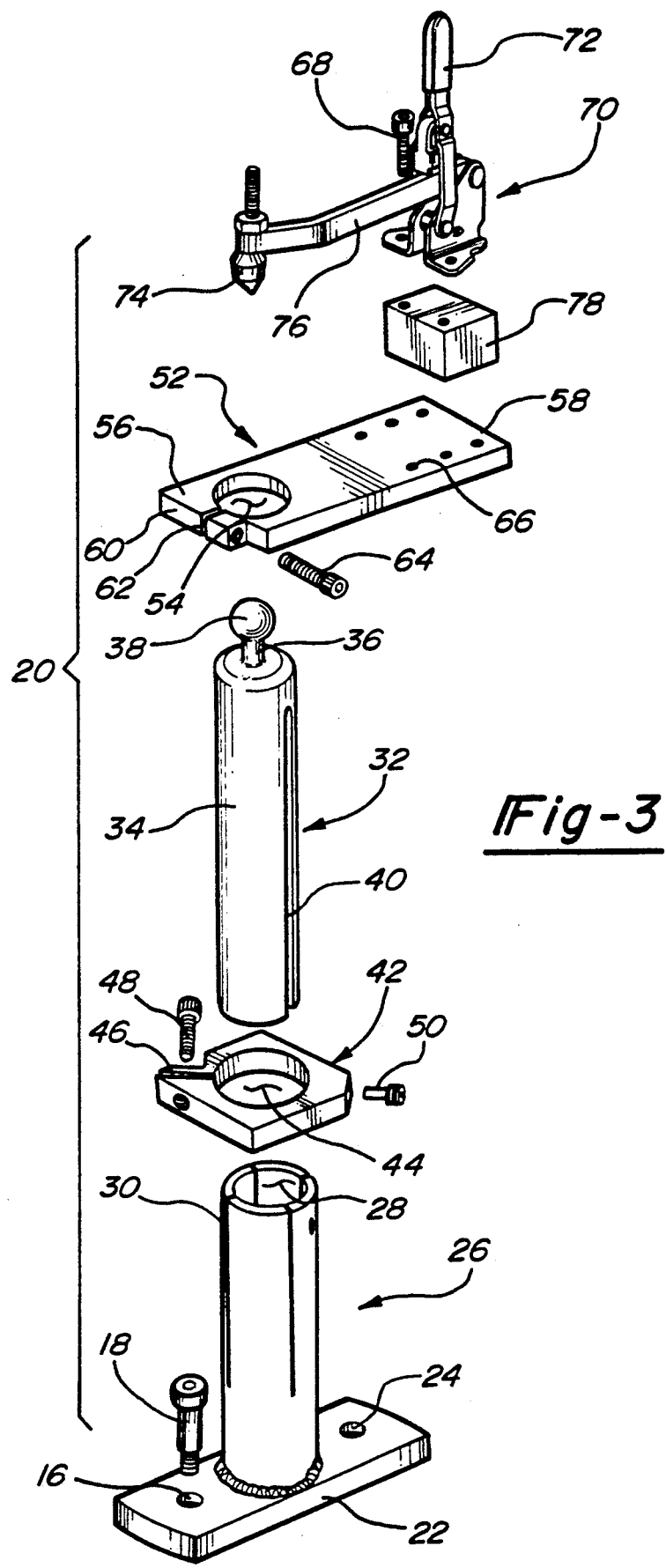
FIG. 3 is an exploded perspective view illustrating a measuring fixture embodiment according to the teachings of the present invention.

Referring to FIGS. 2 and 3 the measuring fixture 20 according to the teachings of the present invention is shown in more detail. The base 22 of the measuring fixture 20 is attached to a matrix platform 14 by fasteners 18. The fasteners 18 are inserted through apertures 24 contained on the base 22 portion of the measuring fixture 20 and inserted into the holes 16 contained on the matrix platform 14. The fasteners 18 which are typically in the form of threaded bolts are screwed into the threaded holes 16 to retain the measuring fixture 20 on the platform 14. The base 22 portion also includes an upwardly extending cylinder 26 having an axial bore 28 extending at least partially therethrough. The axial bore 28 serves to receive a selectively positionable shaft 32 for setting the height of the measuring fixture 20. The shaft 32 includes a cylindrically shaped body 34 which is received within the aperture 28, a neck 36 which extends upwardly from the body 34 and a spherical head 38 which serves to support the workpiece 12. The body of the shaft can optionally be provided with one or more substantially vertically extending slits 40 which assists in precluding rotation of the shaft 32 within the cylinder 26 and setting the shaft 32 at the desired height.

The cylinder 26 also includes a plurality of vertically extending slits 30 which allow the diameter of the cylinder 26 to be adjusted by a clamp 42 which is positioned over the cylinder 26 through a aperture 44. Extending from the aperture 44 is a gap 46 which can be closed to reduce the diameter of aperture 44. The ga 46 is closed by rotating a threaded bolt 48 or other suitable fastener. This in turn reduces the diameter of the aperture 44 and tightly secures the shaft within the cylinder 26 and holds the shaft 32 at the desired height. Bolt 50 which extends through the cylinder 26 and into the axial bore 28 engages the vertical slit 40 contained on the shaft 32 is rotated to tightly abut the shaft 32 to assist in maintaining the shaft at the desired height.

A plate 52 for supporting a clamping mechanism is also provided. The plate 52 includes an aperture 54 located along a first end 56 which is sized to fit over the body 34 of the shaft 32. Extending from the aperture 54 to the edge 60 of the plate 52 is a slot 62 which can be narrowed &:o reduce the diameter of the aperture 54 and to tightly secure the plate 52 to the body 34 of the shaft 32. Typically a threaded fastener 64 such as a bolt or screw extends across the slot 62 and can be rotated to draw the aperture 54 to a reduced diameter. The plate 52 also includes a plurality of spaced apart holes 66 generally located along a second end 58 for receiving fasteners 68 which secure a commercially available clamping mechanism 70 to the plate 52. The holes 66 are spaced apart such that the clamping mechanism 70 can be located at various positions along the plate 52 to accommodate varying sized workpieces. The clamping mechanism 70 typically includes a lever 72 which is actuable to secure and release the workpiece 12 and a tip 74 which extends from arm 76 to selectively engage the workpiece 12.

Optionally, a block 78 can be used in association with the clamping mechanism 70 to adjust the height differential between the clamping mechanism 70 and the plate 52 to accommodate larger workpieces.

Figure 4:
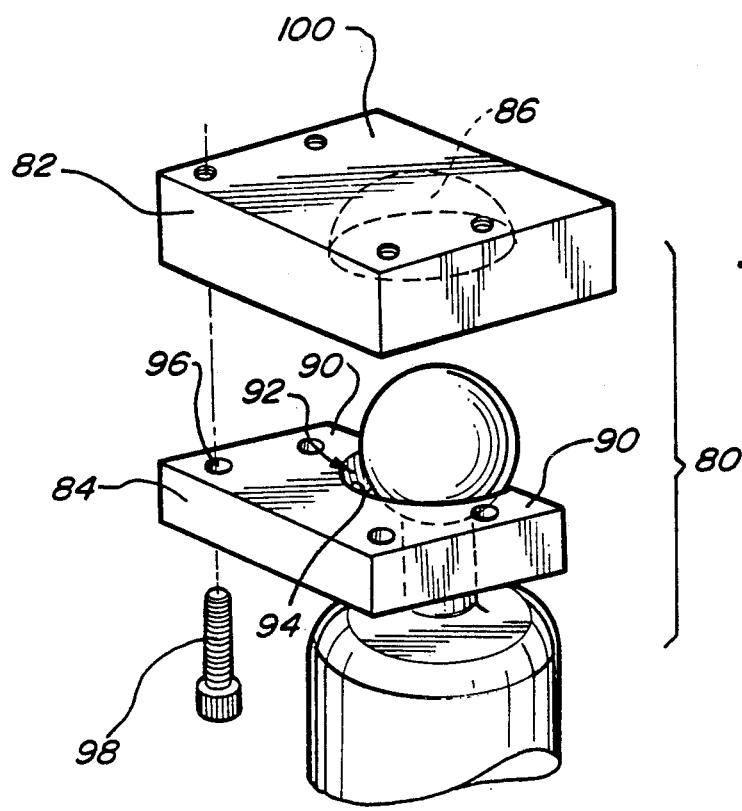
FIG. 4 is an exploded perspective view of a first selectively adjustable support member embodiment.
Figure 5:
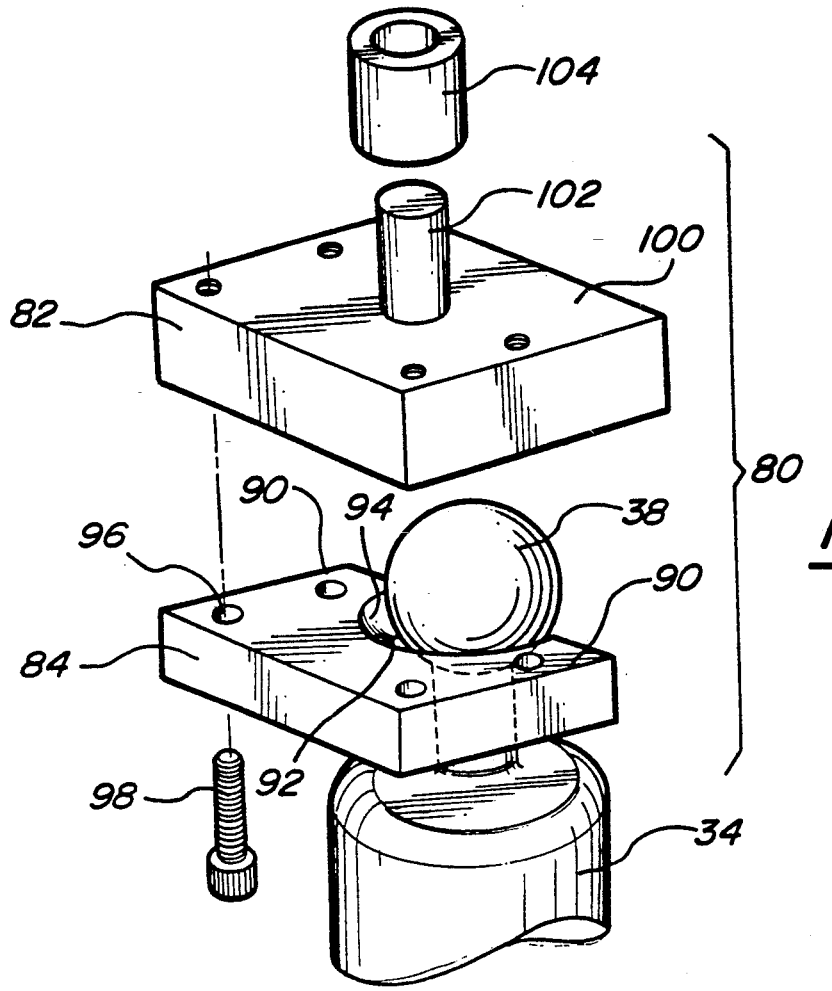
FIG. 5 is an exploded perspective view of a second selectively adjustable support member embodiment including a detachable bushing.
Figure 6:
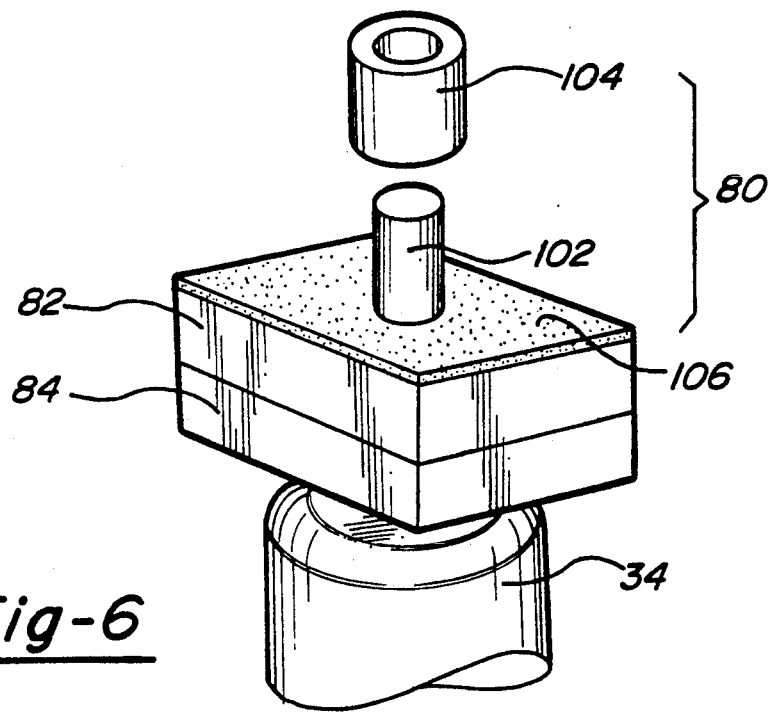
FIG. 6 is a perspective view illustrating a selectively adjustable support member including an elastomeric cover layer.

A selectively adjustable support member 80 attachable over the spherical head 38 as demonstrated in FIGS. 4 and 5 is also provided according to the teachings of the present invention. With reference to the embodiment of FIG. 4, a first attachable selectively adjustable support member embodiment is shown to include mating top and bottom pieces 82 and 84, respectively, which are combinable to form the support member 80. The top piece 82 includes a concave depression 86 which fits over a portion of the spherical head 38. The bottom piece 84 includes a pair of extending leg portions 90 separated by an arcuate recessed portion 92 having a curved surface 94 which matches the contour of a portion of the spherical head 38. The bottom piece 84 also includes a plurality of apertures 96 for receiving fasteners 98 which extend therethrough and are connected to the top piece 82 via apertures 84. Upon combining the top and bottom pieces 82 and 84 via fasteners 96 shown herein as bolts, the support member 80 becomes secured over the spherical head 38. According to the embodiment shown in FIG. 4 the top piece includes a top surface 100 which serves to increase the contact surface area for hosting a portion of the workpiece. Typically, the top surface 100 is flat to host a planar workpiece portion. It should be understood however by those skilled in the art that the top surface 100 can be contoured for receiving various shaped portions of the workpiece. It should further be understood by those skilled in the art that the top surface can be provided with a flexible elastomeric layer 106 which is adhesively or otherwise attached as shown in FIG. 6 which adapts to the contour of the workpiece 12. By firmly tightening the fasteners 98 the support member 80 becomes locked in at the desired angle over the spherical head 38.

With reference to FIG. 5 a second support member embodiment according to the teachings of the present invention is provided. The support member 80 which includes the top piece 82 and a bottom piece 84 as discussed with reference to FIG. 4 is further provided with a post member 102 which extends upwardly from the top surface 100 of the top piece 82. The post member 102 is utilized to locate a hole contained on the work surface and to further retain the work surface by extending through the hole. Optionally, a bushing 104 designed to fit over the post member 102 can be utilized to locate the hole contained on the workpiece and support the workpiece by extending therethrough. Either the post member 102 or the bushing 104 can be provided with an outer surface which matches the shape of the hole contained on the workpiece. For example, the hole may be hexagonal, star shaped or rectangular.

The operational aspects of the present invention will now be described in further detail. The workpiece retention assembly 10 is provided with a plurality of measuring fixtures 20 spaced apart along the platform 14 and fastened thereto for hosting the workpiece 12. Initially, the clamping mechanisms 70 are pulled back to provide clearance for applying the workpiece 12. The workpiece 12 is then positioned upon the measuring fixtures 20 either manually or robotically such that a surface of the workpiece 12 contacts either the spherical head 38 of the shaft 32 or the top surface 100 of the support member 80 depending upon the structural characteristics of the workpiece at a given location. Typically, and especially with regard to workpieces having various contours, both the spherical head 38 and the support member 80 embodiments will be utilized to retain the workpiece as shown in FIG. 2.

At those points along the workpiece which are generally planar the contact surface of the workpiece 12 contacts the top surface 100 of a support member 80.

The support member 80 may be positioned somewhat loosely upon the head 38 of the shaft 32 such that the support member 80 will rotate in response to being contacted by the contact surface of the workpiece 12. After the contact surface of the workpiece 12 is contiguously positioned against top surface 100 of the support member 80 the fasteners 98 which hold the top 82 and bottom 84 pieces of the support member 80 together are tightened to secure the support member 80 in this position. Once all of the support members are tightened and set at the desired angle the clamping mechanism levers 72 are actuated to drive the tips 74 into contact with the workpiece 12. The workpiece 12 is now ready for work operations. It should be noted that by setting the support members 80 in a fixed position a plurality of similarly shaped workpieces can be worked such as in mass production operation.

Alternatively, the support member can be set to a desired position prior to being engaged by a workpiece. For example, a computer aided coordinate measuring machine (now shown) could be utilized to set the support member at a desired angle by contacting the top surface 100 with measuring probe at predetermined x,y and z coordinates, then tightening the support member to the spherical head. The x, y and z coordinates may be taken from a cad system or input to the coordinate measuring machine computer.

The universality of the disclosed measuring fixtures enables the support and positioning of virtually any size and shape workpiece. Uses of the workpiece retention assembly include structural testing, assembly and machining processes of workpieces. Various modifications of the disclosed workpiece retention assembly, and more particularly, the measuring fixtures of the workpiece retention assembly can be made without departing from the spirit and scope of the invention as set forth in the following claims.

What is claimed is:

1. A workpiece retention assembly comprising:
   a platform having a matrix of holes in predetermined locations;
   a plurality of measuring fixtures secured to said platform by fasteners which engage said holes, said measuring fixtures having a sufficient range of movement to support and position a variety of different workpieces, said measuring fixtures including:
   (a) a base portion attachable to said platform;
   (b) a selectively compressible stanchion extending upwardly from said base portion including an axial bore extending at least partially therethrough;
   (c) a shaft disposed at least partially within said axial bore including means for supporting a workpiece, said means including ahead extending from a shaft and a selectively adjustable support member attached over the head of the shaft for receiving the workpiece;
   (d) means for retaining the shaft within said axial bore;
   (e) a plate member attachable to said shaft; and
   (f) an adjustable clamping mechanism including an actuable lever for retaining a workpiece between said support member and said lever.

2. The workpiece retention assembly of claim 1, wherein said support member includes mating top and bottom pieces, said top piece having a concave depression which fittingly engages the spherical head and a top surface for supporting a portion of the workpiece, said bottom piece having first and second legs separated by an arcuate recessed portion which includes a curved surface.

3. The workpiece retention assembly of claim 2, wherein said top surface includes an elastomeric outer layer.

4. The workpiece retention assembly of claim 2, wherein said top surface includes at least one upwardly extending post member for fittingly engaging an aperture contained on the workpiece.

5. The workpiece retention assembly of claim 4, wherein a selectively attachable bushing is provided which fits over said at least one post member to adapt the dimensions of the at least one post member to that of said aperture.

6. The workpiece retention assembly of claim 1, wherein said means for retaining the shaft within said axial bore comprises a clamp which fits over the cylinder, whereby upon sufficient tightening of the clamp the cylinder becomes compressed against the shaft to secure the shaft in place.

7. The workpiece retention assembly of claim 1, wherein the shaft includes at least one vertically disposed slit which is engageable by extending means for precluding rotational movement of the shaft within the cylinder.

* * * * *